United States Patent Office 3,646,220
Patented Feb. 29, 1972

3,646,220
HYDROXYETHYLTHIO PHENOLS AND PROCESS FOR PREPARING SAME
Norman W. Dachs, Buffalo, and Robert Gruber, Tonawanda Township, N.Y., assignors to Hooker Chemical Corporation, Niagara Falls, N.Y.
No Drawing. Filed Aug. 5, 1968, Ser. No. 749,953
Int. Cl. C07c 149/36
U.S. Cl. 260—609 F
17 Claims

ABSTRACT OF THE DISCLOSURE

Hydroxyarylthio compounds of the formula

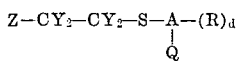

wherein $d$ is from 0 to about 6; Z is selected from the group-consisting of mercapto, hydroxy, alkylthio of 1 to about 10 carbon atoms, alkoxy of 1 to about 10 carbon atoms, alkylthio of 1 to about 10 carbon atoms and alkylcarbonyloxy of 2 to about 10 carbon atoms; Y is selected from the group consisting of hydrogen and alkyl of 1 to about 5 carbon atoms; A is aryl of 6–18 carbon atoms; R is selected from the group consisting of alkyl, aralkyl, alkaryl, aryl, carbaryloxy, alkoxy, aryloxy, alkylthio, arylthio, hydroxy, mercapto, cyano, carboxy and halogen and is of 0 to about 10 carbon atoms and Q is selected from the group consisting of —OH and —O(CO)NHR², wherein R² is alkyl of one to about 10 carbon atoms, provided that when Q is —O(CO)NHR², Z may also be halogen. A typical compound is hydroxyethylthiophenol. A process for the preparation of said compounds and their pesticidal utility are also described.

This invention relates to (2-hydroxyethylthio)phenols, O,S-bis(2-hydroxyethyl)mercaptophenols, a process for their preparation by the reaction of a mercaptophenol and an alkylene oxide, and the derivatives of said (2-hydroxyethylthio)phenols.

It is known that oxirane and thiooxirane rings are readily cleaved by both phenols and mercaptans. The degree of the selectively of the process of the present invention, whereby the mercaptan group first reacts with, for example, ethylene oxide, is unexpected.

In accordance with the present invention, there are provided novel compounds of the formula:

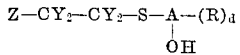

wherein $d$ is from 0 to about 6; Z is selected from the group consisting of mercapto, hydroxy, alkylthio of 1 to about 10 carbon atoms, alkoxy of 1 to about 10 carbon atoms and alkylcarbonyloxy of 2 to about 10 carbon atoms; Y is selected from the group consisting of hydrogen and alkyl of 1 to about 5 carbon atoms; A is aryl of 6 to 18 carbon atoms; R is selected from the group consisting of alkyl, aralkyl, alkaryl, aryl, carbalkoxy, carbaryloxy, alkoxy, aryloxy, alkylthio, arylthio, hydroxy, mercapto, cyano, carboxy and halogen and is of 0 to about 10 carbon atoms.

Also, in accordance with the present invention there are provided processes for the preparation of said compounds, novel carbamate derivatives and the pesticidal utility of said compounds.

A is preferably phenyl, and in said case, $d$ is from 0 to 4, preferably from 0 to about 2.

R₁ is a substituent on the aryl nucleus, When R is alkyl, aralkyl, alkaryl, aryl, carbaryloxy, alkoxy, aryloxy, alkylthio, arylthio, it is an unsubstituted hydrocarbon that may contain oxygen or sulfur. R is preferably alkyl, aryl, halogen or hydroxy. R can be chlorine, fluorine, bromine or iodine.

The following list is illustrative of the compounds included within the present invention.

2-(2-hydroxyethylthio)-3-methoxyphenol
2-(2-methoxyethylthio)-5-phenoxyphenol
2-(2-methoxyethylthio)-4-t-butylphenol
2-(2-methoxy-1-butylethylthio)-4-t-butylphenol
2-(2-hydroxyethylthio)-3-hydroxyphenol
2-(2-acetoxyethylthio)-3,4-dimethylphenol
3-(2-acetoxyethylthio)-2,4-dichlorophenol
2-(2-acetoxyethylthio)-4-ethyloxyphenol
2-(2-hydroxyethylthio)phenol
4[2(carbethoxy)ethylthio]phenol
3-(2-mercaptoethylthio)phenol
4-(2-mercaptoethylthio)phenol
3-(2-methylthioethylthio)phenol
2-(2-methoxypropylthio)-4,5-dimethylphenol
3-(2-hydroxy-1-methylethylthio)phenol
3-(2-ethylthioethylthio)-4,5-di-t-butylphenol
2-(2-hydroxyethylthio)-3-methoxyphenyl N-methylcarbamate
2-(2-methoxyethylthio)-4-t-butylphenyl N-propylcarbamate
3-(2-acetoxyethylthio)-4,5-dimethylphenyl N-butylcarbamate
3-(2-chloroethylthio)phenyl N-pentylcarbamate
3-(2-hydroxy-1-methylethylthio)phenyl N-ethylcarbamate
4-(2-ethylthioethylthio)-3,5-di-t-butylphenyl N-methylcarbamate The (hydroxyethylthio)phenols and (mercaptoethylthio)phenols of the present invention are prepared by reacting a mercaptophenol with an alkylene oxide or alkylene sulfide of the formula

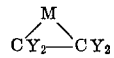

wherein M is —O— or —S—. Typical sulfides and oxides are ethylene oxide, propylene oxide and ethylene sulfide.

Although said reaction may be conducted in the absence of a solvent, it is normally conducted in the presence of a solvent, preferably an organic solvent. Typical solvents include benzene, toluene, xylene, heptane, hexane, chloroform, carbon tetrachloride, chlorobenzene, ethanol, t-butanol, acetic acid, dioxane, N,N-dimethylformamide, N-methyl-2-pyrrolidone, tetrahydrofuran and dimethylsulfoxide.

Although said reaction may be conducted at a temperature of about 0 to about 200 degrees centigrade, the preferred temperature is from about 10 to about 150 degrees centigrade.

Although said reaction may be conducted in the absence of a catalyst, the time and temperature required to complete the reaction may generally be reduced by using a basic catalyst. A catalytic amount of about .05 mole of catalyst per mole of mercaptophenol is preferably employed. Suitable catalysts include salts of strong bases and alcohols or weak acids, amines, quaternary amine bases and alkali or alkaline earth metals or hydroxides. Examples of catalysts are sodium methylate, sodium acetate, potassium carbonate, triethylamine, piperidine, triethylene diamine, trimethylbenzylammonium hydroxide and sodium or magnesium metal and sodium hydroxide.

The starting mercaptophenol compounds used in the process of the present invention are of the formula: HS—A(R)$_d$OH, wherein A, R and $d$ are as hereinbefore described. Said compounds may be prepared by methods known in the prior art or by the procedure described in copending application Ser. No. 597,228, filed Nov. 28, 1966. Mercaptophenols such as o-mercaptophenol, p-mercaptophenol, 3,5-dimethyl-2-mercaptophenol, 4-phenyl-2-mercaptophenol, 3-cyano-2-mercaptophenol and 4-carboxy-3-mercaptophenol, are typical starting compounds.

The (hydroxyethylthio)phenols of the present invention can be reacted with thionyl bromide or thionyl chloride to obtain the corresponding (bromoethylthio)phenol and (chloroethylthio)phenol. These reactions are preferably conducted in the presence of an organic solvent, such as chloroform, carbon tetrachloride and dioxane.

The (alkylcarbonyloxy)phenols of the present invention can be prepared by reacting the (hydroxyethylthio)-phenols with a carboxycyclic acid of the formula RCOOH; wherein said carboxycyclic acid is of 2 to about 10 carbon atoms. This reaction is acid-catalyzed.

The (chloroethylthio)phenol derivatives can be further reacted with an alcohol or mercaptan of the formula ROH or RSH; wherein R is alkyl of 1 to about 10 carbon atoms, to form an (alkyloxyethylthio)phenol or a (alkylthioethylthio)phenol. This reaction is preferably base-catalyzed.

The (hydroxyethylthio)phenols and derivatives thereof can be reacted with alkyl isocyanates of 2 to about 6 carbon atoms to obtain pesticidal carbamate compositions of the formula

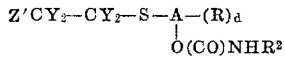

Subscript $d$ and Y, A and R are as hereinbefore described. Z' can be either Z or chlorine or bromine. $R^2$ is alkyl of 1 to about 5 carbon atoms. Said carbamate compositions are preferably conducted at a temperature of 20 degrees centigrade to about 80 degrees centigrade in the presence of organic solvents, such as benzene, toluene, xylene, heptane and hexane.

The compounds of the present invention have utility as peticides. Preparations containing compounds of the present invention are conveniently made up as liquid or as solid formulations and as such they exhibit insecticidal activity. Examples of solid formulations are dust, wettable powders, granules and pellets, which may contain a solid extender or carrier, such as sand, clays, talcs, sawdust and the like. Where liquid formulations are desirable, liquid extenders, diluents or carriers of a nonreactive nature are generally utilized, such as water, alcohols, glycols, petroleum distillates, and the like.

In addition to the aforementioned reaction of mercaptophenols, with ethylene oxide to form (2-hydroxyethylthio)phenols, the mercaptophenols or the (2-hydroxyethylthio)phenols can be reacted to a great extent with ethylene oxide to form (2-hydroxyethylthio)-2-hydroxyethyloxyphenols of the formula

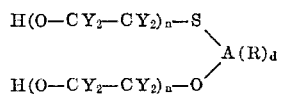

wherein $n$ is one. Said reaction proceeds as a continuation of the monooxyalkylation reaction and is conducted under similar conditions. Said reaction is preferably conducted at a temperature of about 50 degrees centigrade to about 120 degrees centigrade in the presence of solvents such as benzene, toluene, xylene, a catalyst such as triethylamine, and stoichiometric excess of ethylene oxide. Said compounds are particularly useful as biologically active compounds. Still further reaction with alkylene oxide under superatmospheric pressure can proceed to give compounds wherein $n$ is two to about 25.

In similar type reactions, the mercaptophenols can be reacted with lactones, such as β-propiolactone, α-butyrolactone, α-valerolactone and ε-caprolactone and ethylene carbonate and ethylene sulfides.

The following examples will further illustrate specific embodiments of this invention. It should be understood, however, that these examples are given by way of illustration, and not limitation. All temperatures are in degrees centigrade and all parts are by weight, unless otherwise indicated.

EXAMPLE 1

To a mixture containing 0.2 part of triethylamine, 5.2 parts of ethylene oxide and about 80 parts of benzene, 15 parts of o-mercaptophenol were added. The reactor containing the mixture was sealed and heated to 100 degrees centigrade for four hours. The solvent was then distilled off leaving 20 parts of a colorless oil identified as 2-(2-hydroxyethylthio)phenol with a boiling point of 136–138 degrees centigrade.

*Analysis.*—Calculated for $C_8H_{10}S$ (percent): S, 18.83. Found (percent): S, 18.69.

In a similar manner, ethylene sulfide is reacted with o-mercaptophenol to obtain a comparable yield of 2-(2-mercaptoethylthio) phenol.

EXAMPLE 2

To a mixture containing 0.3 part of triethylamine, 12 parts of ethylene oxide and about 150 parts of benzene, 40 parts of 2-mercapto-3,5-dimethyl phenol were added. The resulting mixture was heated for about four hours at a temperature of 100 degrees centigrade. The solvent was removed and the residue, boiling point 138–140 degrees centigrade, was identified as 3,5-dimethyl-2-(2-hydroxyethylthio) phenol.

*Analysis.*—Calculated for $C_{10}H_{14}O_2S$ (percent): S, 16.17. Found (percent): S, 16.0.

EXAMPLE 3

To about 30 parts of acetic acid, 25 parts of 2-(2-hydroxyethylthio)-3,5-dimethylphenol and about 400 parts of concentrated hydrochloric acid were added. The mixture was heated to 50 degrees centigrade for about 20 minutes, and after standing for several hours at room temperature the precipitated oil was removed and the remaining solvent distilled off under reduced pressure. The product was identified as 2-(2-acetoxyethylthio)-3,5-dimethylphenol.

*Analysis.*—Infrared absorption (liquid film): phenolic OH, 3380 cm.$^{-1}$; ester C=O, 1740 cm.$^{-1}$.

EXAMPLE 4

In about 45 parts of carbon tetrachloride, 8.0 parts of 2-(2-hydroxyethylthio)phenol were dissolved. To the resulting solution 7 parts of thionyl chloride were added over a 15 minute period. The resulting mixture was then heated to reflux for about four hours. Then the excess thionyl chloride and carbon tetrachloride were removed under reduced pressure and distilled to give 9 parts of a colorless oil, boiling at 98–100 degrees centigrade, identified as 2-(2-chloroethylthio)phenol.

*Analysis.*—Calculated for $C_8H_9ClOS$ (percent): S, 17.0; Cl, 18.79. Found (percent): S, 17.4; Cl, 18.9.

In about 75 parts of carbon tetrachloride, 16 parts of 2-(2-hydroxyethylthio)-3,5-dimethylphenol were dissolved. To the resulting solution, maintained at a temperature of about 10 to about 15 degrees centigrade, 13 parts of thionyl chloride were added during a 20 minute period. The reaction mixture was refluxed for about four hours, after which time the solvent and excess thionyl chloride were removed under reduced pressure. A remaining residue was recrystallized from hexane to give 13 parts of a white crystalline solid, melting point of about 52–53 degrees centigrade and identified as 2-(2- chloroethylthio)-3,5-dimethylphenol.

*Analysis.*—Calculated for $C_{10}H_{13}ClOS$ (percent): Cl, 16.36; S, 14.76. Found (percent): Cl, 16.5; S, 14.8.

In about 100 parts of methanol about 0.1 part silver nitrate, 5.0 parts of the above prepared, 2-(2-chloroethylthio)-3,5-dimethylphenol were refluxed for about 24 hours. The excess methanol was removed. A greater than a 90 percent yield of a colorless oil which was identified as 2-(2-methoxyethylthio)phenol was obtained.

*Analysis.*—Infrared absorption (liquid film): phenolic OH, 3360 cm.$^{-1}$; methoxy, 1118 cm.$^{-1}$.

In a similar manner butanol-2 is reacted with the above prepared 2-(2-chloroethylthio)phenol in the presence of a catalytic amount of sodium to give 2-(1-methylpropyl-oxyethylthio)phenol in a comparable yield.

EXAMPLE 5

Ethylene oxide, 22 parts (0.5 mole), was passed into a solution of 63 parts (0.5 mole) of p-mercaptophenol and 0.03 part of triethylamine during a two hour period. Gentle heating to about a temperature of 65 degrees centigrade was required to keep the reaction mixture molten. The crude product was recrystallized from water to give 39.9 parts of near-white crystals, melting point 71.8–73.0. A second crop of 20.0 parts was obtained by concentrating the mother liquor. The product was identified as 4-(2-hydroxyethylthio)phenol.

*Analysis.*—Calculated for $HOC_6H_4SCH_2CH_2OH$: phenolic hydroxyl, 5.88 milliequivalents/gram; S, 18.8 percent. Found: phenolic hydroxyl, 6.00 milliequivalents/gram S, 18.7 percent.

In a similar manner, ethylene sulfoxide is reacted with p-mercaptophenol to obtain a comparable yield of 4-(2-mercaptoethylene) phenol.

EXAMPLE 6

Ethylene oxide was continuously passed into a solution of 354 parts (2.83 moles) of o-mercaptophenol and 3 parts of triethylamine during a period of seven hours. The reaction was exothermic. Gentle cooling controlled the temperature rise to a maximum of 88 degrees. On fractional distillation of the product, 322 parts of a cut boiling at 155–160 degrees centigrade per 0.10 millimeter was collected. The product was identified as 1-(2-hydroxyethyl-oxy)-2-(2-hydroxyethylthio)benzene.

*Analysis.*—Calculated aliphatic hydroxyl value: 9.35 milliequivalents per gram. Found: 9.35 milliequivalents per gram.

EXAMPLE 7

To about 10 parts of benzene, 1.5 parts of 2-(2-methoxyethylthio) phenol were dissolved. Then 2 parts of methyl isocyanate were added. After standing for several hours the benzene was removed leaving 1.7 parts of a white crystalline solid identified as 2-(2-methoxyethylthio) N-methylphenyl carbamate.

*Analysis.*—Calculated for $C_{11}H_{14}NO_3S$ (percent): S, 13.28; N, 5.81. Found (percent S, 12.8; N, 6.2.

The carbamate compositions of Examples 9 through 12 were prepared in a similar manner from the 2-(2-hydroxyethylthio)phenol derivatives and were tested for insecticidal activity.

INSECTICIDE TESTS

Aphid test

Insecticidal activity as a contact poison was tested by infesting ten-day old nasturtium plants with black bean aphids (*Aphis fabae* Scop.) so that the first two leaves had from 50–100 aphids, spraying with the chemical to be tested, and caging in a piece of tubing which was coated with talcum powder to prevent the escape of the aphids. Mortality was recorded by counting the number of dead aphids. Insecticidal activity as a stomach poison was tested by first spraying the leaves with the chemical to be tested and then infesting with the aphids.

MITE TEST

Young pole lima bean plants (Sieva variety) were infested with 50–100 adult mites (*Tetranychus telariul* L.) on both primary leaves, sprayed 24 hours thereafter with the chemical to be tested, and placed in the greenhouse from 24 to 48 hours, after which mortality was recorded by counting the number of dead mites.

Mexican bean beetle

Primary leaves of lima bean plants were excised, dipped into a solution of the chemical to be tested, and dried. Then 5 larvae (fourth instar) of the Mexican bean beetle (*Epilachna varivestis* Muls.) were placed thereon, and the leaves were so enclosed that the insects could not escape. Mortality was recorded by counting the number of dead larvae, and the percent leaf consumed by the larvae was estimated.

Housefly test

Newly hatched adult houseflies (*Musca domestica* L.) were, while under the action of carbon dioxide, immersed in the chemical solution to be tested, shaken for a few seconds, and screened out into a paper cup containing filter paper which was dipped in sugar solution, said cup then being covered to prevent escape of the flies. Ten flies were used per treatment. Date was taken on the number of flies knocked down in two hours, and killed in 24 hours.

EXAMPLE 8

The compound of the formula

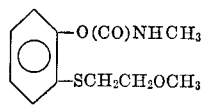

killed 100 percent of the Mexican bean beetles at a concentration of 1000 parts per million and 60 percent at 125 parts per million. It killed 100 percent of the mites at a concentration of 1000 parts per million, knocked down 100 percent of the houseflies at a concentration of 125 parts per million and killed 100 percent of the houseflies at a concentration of 500 parts per million. As an aphid contact poison it killed 90 percent at a concentration of 250 parts per million, and as a stomach poison it killed 100 percent at a concentration of 69 parts per million.

EXAMPLE 9

The compound of the formula

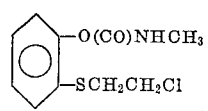

killed 100 percent and 84 percent of the aphids as a contact poison at the respective concentrations of 250 and 125 parts per million. At a concentration of 250 parts per million, it knocked down 100 percent and killed 100 percent of the houseflies.

EXAMPLE 10

The compound of the formula

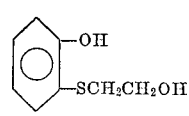

killed 41 percent of the aphids as a contact poison and 40 percent of the Mexican bean beetles at a concentration of 1000 parts per million.

EXAMPLE 11

The compound of the formula

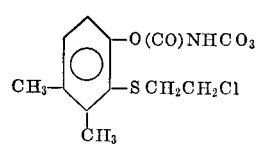

killed 100 percent of the houseflies at a concentration of 1000 parts per million.

EXAMPLE 12

The compound of the formula

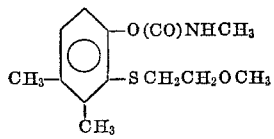

killed 100 percent of the aphids as a contact poison at a concentration of 1000 parts per million and 100 percent of the houseflies at a concentration of 1000 parts per million.

EXAMPLE 13

The compound of the formula

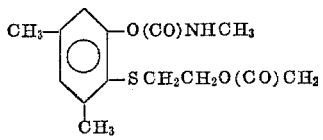

killed 100 percent of the houseflies at a concentration of 1000 parts per million.

While there have been described various embodiments of the present invention, the methods and compositions described are not intended to be understood as limiting the scope of the invention as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A compound of the formula

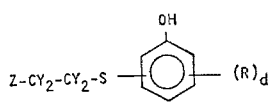

wherein $d$ is from 0 to 4; Z is selected from the group consisting of mercapto, hydroxy, chlorine and bromine; Y is selected from the group consisting of hydrogen and alkyl of 1 to 5 carbon atoms; R is selected from the group consisting of mercapto, hydroxy, halogen, and a group of up to 10 carbon atoms selected from the group consisting of alkyl, alkylthio, alkoxy and phenoxy.

2. A compound according to claim 1, wherein Y is hydrogen.

3. A compound according to claim 1, wherein $d$ is two and R is methyl.

4. A compound according to claim 1, wherein $d$ is zero.

5. A compound according to claim 1, wherein Z is hydroxy.

6. A compound according to claim 1, wherein Z is chlorine.

7. The compound of claim 1, wherein R is hydroxy.

8. The compound of claim 1 wherein R is alkyl.

9. The compound of claim 1 wherein R is alkoxy.

10. The compound of claim 1 wherein Z is mercapto.

11. A compound of the formula

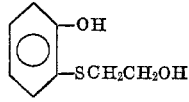

12. A process comprising reacting in the presence of a basic catalyst a compound of the formula

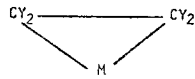

with a compound of the formula

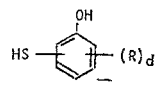

in about equimolar amounts at a temperature of about 0 to about 200 degrees centigrade, wherein $d$ is from 0 to 4; M is selected from the group consisting of sulfur and oxygen; Y is selected from the group consisting of hydrogen and alkyl of 1 to 5 carbon atoms; and R is selected from the group consisting of mercapto, hydroxy, halogen and a group of up to 10 carbon atoms selected from the group consisting of alkyl, alkoxy, alkylthio and phenoxy, and obtaining therefrom an essentially pure compound of the formula

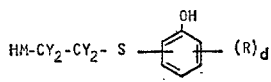

13. A process in accordance with claim 2, wherein the reaction is conducted in the presence of a solvent.

14. The process of claim 12, wherein M is oxygen.

15. The process of claim 12, wherein Y is hydrogen.

16. The process of claim 12, wherein R is alkyl.

17. The process of claim 12, wherein $d$ is 0.

References Cited

FOREIGN PATENTS

| | | | |
|---|---|---|---|
| 887,504 | 1953 | Germany | 260—609 |
| 42,179 | 9/1967 | Japan | 260—609 |

OTHER REFERENCES

Malinovskii: "Epoxides and their Derivatives" (1965) p. 195.

Nenitzescu: "Ber." vol. 68 pp. 587–90 (1935).

CHARLES B. PARKER, Primary Examiner

D. R. PHILLIPS, Assistant Examiner

U.S. Cl. X.R.

260—465 R, 465 D, 470, 478, 479 C, 482, 488 CD, 516, 609 D; 424—300, 301, 304, 335, 337

PO-1050
(5/69)

UNITED STATES PATENT OFFICE
CERTIFICATE OF CORRECTION

Patent No. 3,646,220  Dated February 29, 1972

Inventor(s) Norman W. Dachs and Robert Gruber

It is certified that error appears in the above-identified patent and that said Letters Patent are hereby corrected as shown below:

Column 1, line 68 "$R_1$" should read ---R,---.
Column 4, line 12 "$C_8H_{10}S$" should read --$C_8H_{10}O_2S$---.

Signed and sealed this 29th day of August 1972.

(SEAL)
Attest:

EDWARD M. FLETCHER, JR.                 ROBERT GOTTSCHALK
Attesting Officer                       Commissioner of Patents